United States Patent
Jeon

(10) Patent No.: US 9,611,870 B2
(45) Date of Patent: Apr. 4, 2017

(54) CONSTRUCTION EQUIPMENT PRESSURE CONTROL VALVE

(71) Applicant: VOLVO CONSTRUCTION EQUIPMENT AB, Eskilstuna (SE)

(72) Inventor: Man-Seuk Jeon, Changwon-si (KR)

(73) Assignee: VOLVO CONSTRUCTION EQUIPMENT AB (SE)

( * ) Notice: Subject to any disclaimer, the term of this patent is extended or adjusted under 35 U.S.C. 154(b) by 0 days.

(21) Appl. No.: 14/765,586

(22) PCT Filed: Feb. 5, 2013

(86) PCT No.: PCT/KR2013/000926
§ 371 (c)(1),
(2) Date: Aug. 4, 2015

(87) PCT Pub. No.: WO2014/123251
PCT Pub. Date: Aug. 14, 2014

(65) Prior Publication Data
US 2015/0377259 A1 Dec. 31, 2015

(51) Int. Cl.
*F15B 13/01* (2006.01)
*E02F 9/22* (2006.01)
(Continued)

(52) U.S. Cl.
CPC .............. *F15B 13/01* (2013.01); *E02F 9/226* (2013.01); *E02F 9/2228* (2013.01);
(Continued)

(58) Field of Classification Search
CPC .... F15B 13/01; F15B 13/015; F15B 13/0426; F16K 11/00; E02F 9/226; E02F 9/2228; E02F 9/2267
(Continued)

(56) References Cited

U.S. PATENT DOCUMENTS 5,752,384 A * 5/1998 Schmitt ................... F15B 11/16
60/426
5,921,165 A * 7/1999 Takahashi ............... E02F 9/226
91/426

(Continued)

FOREIGN PATENT DOCUMENTS

CN 1914384 A 2/2007
CN 101135324 A 3/2008
(Continued)

OTHER PUBLICATIONS

First Office Action issued by the State Intellectual Property Office (SIPO) on Apr. 19, 2016 concerning the corresponding China patent Application No. 201380072352.1 (with English translation). (13 pages).

(Continued)

*Primary Examiner* — Kevin Murphy
*Assistant Examiner* — Minh Le
(74) *Attorney, Agent, or Firm* — Harness, Dickey & Pierce, P.L.C.

(57) ABSTRACT

A pressure control valve for a construction machine is disclosed, which prevents self-weight descent of a working device due to leakage of hydraulic fluid in a neutral position of the working device. The pressure control valve for a construction machine includes a holding valve block having a pilot signal pressure port and a drain flow path formed thereon; a holding poppet having a back pressure chamber formed therein to intercept leakage of hydraulic fluid from the hydraulic actuator to the control valve in a neutral state; a first elastic member pressing the holding poppet and elastically biasing an intercepted path between the hydraulic actuator and the control valve; a piston sliding in the holding valve block when pilot signal pressure is input through the pilot signal pressure port; a pilot poppet shifted to drain the hydraulic fluid in the back pressure chamber toward a drain (Continued)

flow path of the control valve in response to movement of the piston; a second elastic member pressing the pilot poppet and elastically biasing an intercepted path between the back pressure chamber of the holding poppet and the drain flow path of the control valve; and an auxiliary drain path draining the leaking hydraulic fluid through a drain path of the holding valve block if the leakage of the hydraulic fluid occurs on a check valve that opens or closes the path between the back pressure chamber of the holding poppet and the drain flow path of the control valve.

5 Claims, 5 Drawing Sheets

(51) Int. Cl.
  *F16K 11/07*    (2006.01)
  *F15B 13/042*   (2006.01)
(52) U.S. Cl.
  CPC .......... *E02F 9/2267* (2013.01); *F15B 13/015* (2013.01); *F15B 13/0426* (2013.01); *F16K 11/07* (2013.01)
(58) Field of Classification Search
  USPC ........... 137/596.2, 613; 91/536, 445; 251/89
  See application file for complete search history.

(56) References Cited

U.S. PATENT DOCUMENTS

| | | | | |
|---|---|---|---|---|
| 5,957,159 A * | 9/1999 | Takahashi | ............. | E02F 9/2225 137/596 |
| 6,691,510 B2 * | 2/2004 | Kariya | ................. | F15B 11/003 60/403 |
| 6,907,815 B2 * | 6/2005 | Kim | ........................ | E02F 9/226 91/442 |
| 6,915,729 B2 * | 7/2005 | Kim | ........................ | E02F 9/226 137/596.13 |
| 7,017,470 B2 * | 3/2006 | Cheong | ................. | E02F 9/2203 91/445 |
| 7,162,946 B2 * | 1/2007 | Jeon | ..................... | F15B 11/003 91/445 |
| 7,175,155 B2 * | 2/2007 | Takiguchi | ............. | F15B 11/003 251/29 |
| 8,113,233 B2 * | 2/2012 | Jeon | ...................... | E02F 9/2267 137/489.5 |
| 8,393,348 B2 * | 3/2013 | Tougasaki | ........... | F15B 13/0417 137/115.19 |
| 8,733,391 B2 | 5/2014 | Jeon | | |
| 9,085,875 B2 * | 7/2015 | Ku | ........................ | E02F 9/2267 |
| 9,103,355 B2 | 8/2015 | Ku et al. | | |
| 2013/0277582 A1 * | 10/2013 | Kang | .................... | E02F 9/2267 251/89 |
| 2013/0333367 A1 | 12/2013 | Jeon et al. | | |
| 2014/0345268 A1 | 11/2014 | Jeon | | |
| 2015/0113970 A1 | 4/2015 | Jeon | | |
| 2015/0159678 A1 * | 6/2015 | Kim | ..................... | E02F 9/2267 137/596.14 |

FOREIGN PATENT DOCUMENTS

| | | |
|---|---|---|
| CN | 101761523 A | 6/2010 |
| CN | 102022612 A | 4/2011 |
| CN | 102686809 A | 9/2012 |
| CN | 103597218 A | 2/2014 |
| JP | 2001-280516 A | 10/2001 |
| KR | 20030046752 A | 6/2003 |
| KR | 20060112340 A | 11/2006 |
| KR | 10-0800081 B1 | 2/2008 |
| KR | 20100039725 A | 4/2010 |
| KR | 10-2010-0075290 A | 7/2010 |
| KR | 10-0998611 B1 | 12/2010 |
| WO | WO-2008150384 A1 | 12/2008 |
| WO | WO-2012091194 A1 | 7/2012 |

OTHER PUBLICATIONS

First Office Action issued by the State Intellectual Property Office (SIPO) on May 30, 2016 concerning the corresponding China patent Application No. 201380070774.5 (with English translation). (19 pages).

International Search Report (in English and Korean) and Written Opinion of the International Searching Authority (in Korean) for PCT/KR2013/000926, mailed Jun. 17, 2013; ISA/KR.

* cited by examiner

Prior Art

Prior Art

CONSTRUCTION EQUIPMENT PRESSURE CONTROL VALVE

CROSS-REFERENCE TO RELATED APPLICATIONS

This application is a U.S. National Stage Application of International Application No. PCT/KR2013/000926 filed on Feb. 5, 2013, and was published in Korean as WO 2014/123251 A1 on Aug. 14, 2014. The disclosure of the above application is incorporated herein by reference.

TECHNICAL FIELD

The present invention relates to a pressure control valve for a construction machine, and more particularly, to a pressure control valve for a construction machine, which can prevent a self-weight descent of a working device due to leakage of hydraulic fluid in a neutral position of the working device.

BACKGROUND OF THE INVENTION

In general, a holding valve that is mounted on a main control valve (MCV) of a construction machine is used to prevent a self-weight descent of a working device such as a boom, due to leakage of hydraulic fluid through a gap between a spool and a valve block in a neutral position of the working device, such as a boom, and to control the hydraulic fluid that is supplied to a hydraulic actuator when the working device is operated.

As illustrated in FIGS. 1 to 3, a pressure control valve for a construction machine in the related art includes a holding valve block 4 having a pilot signal pressure port 1 and a drain flow path 2 formed thereon and installed between a hydraulic actuator (boom cylinder or the like, not illustrated) and a control valve 3, a holding poppet 6 having a back pressure chamber 5 formed therein to intercept leakage of hydraulic fluid from the hydraulic actuator to the control valve 3 in a neutral state, a first elastic member 7 pressing the holding poppet 6 and elastically biasing an intercepted path between the hydraulic actuator and the control valve 3 in an initial state, a piston 8 sliding in the holding valve block 4 when pilot signal pressure is input through the pilot signal pressure port 1, a pilot poppet 11 shifted along an inner surface of a sleeve 9 of the holding valve block 4 to drain the hydraulic fluid in the back pressure chamber 5 toward a drain flow path 10 of the control valve 3 in response to movement of the piston 8, and a second elastic member 12 pressing the pilot poppet 11 and elastically biasing an intercepted path between the back pressure chamber 5 of the holding poppet 6 and the drain flow path 10 of the control valve 3 in an initial state.

According to the pressure control valve in the related art as configured above, if a spool 3a of the control valve 3 is shifted in a rightward direction as shown in FIG. 2 by applying a control signal through an operation of an operation lever (RCV lever) to drive boom-up or arm-out, hydraulic fluid that is discharged from the hydraulic pump 13 moves through a parallel path 14 and a flow path 15 to lift the holding poppet 6 in an upward direction in the drawing. In this case, hydraulic fluid in the back pressure chamber 5 flows toward a cylinder port 16 through an orifice 19.

Through the movement of the holding poppet 6, the flow path 15 and the cylinder port 16 on the side of the hydraulic actuator communicate with each other, and thus the hydraulic fluid that is discharged from a hydraulic pump 13 is supplied to the hydraulic actuator to drive the hydraulic actuator to perform boom-up operation. In this case, the drain flow path 10 of the control valve 3 that communicates with the flow path 15 is closed by a check valve 17 of the holding valve block 4.

Since an excavator or the like mainly operates in a work environment having poor work conditions due to the equipment characteristics, fine foreign substances, such as dust, exert a bad influence on valve seat surfaces of various kinds of control valves. As an example, if foreign substances stick to a valve seat surface 17a of the check valve 17, a sealing function is not normally performed between the check valve 17 and the valve seat surface 17a to cause leakage of the hydraulic fluid.

If a check function of the check valve 17 is not performed, the hydraulic fluid, which is supplied from the hydraulic pump 13 to the flow path 15, moves to a port 18 on the side of the pilot poppet 11 via the drain flow path 10 and the check valve 17.

Since the pilot poppet 11 moves along the sleeve 9 in a downward direction in the drawing by the hydraulic fluid that is supplied to the port 18 (in the case where the hydraulic fluid pressure that is applied to the pilot poppet 11 exceeds an elastic force of the second elastic member 12), the port 18 and the back pressure chamber 5 in the holding poppet 6 communicate with each other. That is, under normal conditions, the pilot poppet 11 moves in a downward direction only by the movement of the piston 8, but it moves abnormally in the downward direction due to an inferior sealing function of the check valve 17.

On the other hand, a pressure receiving area of the holding poppet 6, to which pressure is applied in the back pressure chamber 5, becomes relatively larger than the pressure receiving area of the holding poppet 6 in a region in which pressure is gone through the orifice 19. Due to this, the pressure in the back pressure chamber 5 is gradually increased to move the holding poppet 6 in the downward direction in the drawing with the lapse of time, and thus the path that makes the flow path 15 and the cylinder port 16 communicate with each other is intercepted.

Accordingly, in the case of performing a boom-up operation of a boom or an arm-out operation of an arm, the operating speed of the hydraulic actuator is lowered, and an excessive load is continuously generated in a hydraulic circuit of the equipment. Since this causes a loss of hydraulic energy, work efficiency is deteriorated.

SUMMARY OF THE INVENTION

Accordingly, the present invention has been made to solve the aforementioned problems occurring in the related art, and it is an object of the present invention to provide a pressure control valve for a construction machine, which can prevent noise occurrence due to an excessive pressure increase and prevent work efficiency from being lowered due to deterioration of an operating speed of a working device by intercepting an inflow of hydraulic fluid toward a control valve, which leaks due to an inferior sealing function on a valve seat surface when a boom-up operation or an arm-out operation is performed.

Technical Solution

To achieve the above objects, in accordance with an embodiment of the present invention, there is provided a pressure control valve for a construction machine, which includes a holding valve block having a pilot signal pressure port and a drain flow path formed thereon and installed between a hydraulic actuator and a control valve; a holding poppet having a back pressure chamber formed therein to intercept leakage of hydraulic fluid from the hydraulic actuator to the control valve in a neutral state; a first elastic member pressing the holding poppet and elastically biasing an intercepted path between the hydraulic actuator and the control valve in an initial state; a piston sliding in the holding valve block when pilot signal pressure is input through the pilot signal pressure port; a pilot poppet shifted along an inner surface of a sleeve of the holding valve block to drain the hydraulic fluid in the back pressure chamber toward a drain flow path of the control valve in response to movement of the piston; a second elastic member pressing the pilot poppet and elastically biasing an intercepted path between the back pressure chamber of the holding poppet and the drain flow path of the control valve in an initial state; and an auxiliary drain path draining the leaking hydraulic fluid through a drain path of the holding valve block after passing through the pilot poppet if the leakage of the hydraulic fluid occurs on a valve seat surface of a check valve that opens or closes the path between the back pressure chamber of the holding poppet and the drain flow path of the control valve.

As the auxiliary drain path, an inner surface of the sleeve, on which the pilot poppet slides, may be formed in a rectangular shape, and a slot that can move the hydraulic fluid may be formed at a corner of an outer surface of the pilot poppet that is formed corresponding to the inner surface of the sleeve.

As the auxiliary drain path, a notch portion that can move the hydraulic fluid may be formed on an outer surface of the pilot poppet that slides along an inner surface of the sleeve in an axis direction.

As the auxiliary drain path, a hydraulic fluid moving hole may be formed inside the pilot poppet that slides along an inner surface of the sleeve in an axis direction, and a hydraulic fluid inflow hole and a hydraulic fluid discharge hole may be formed at an end portion of the hydraulic fluid moving hole in a radius direction to communicate with the hydraulic fluid moving hole.

As the auxiliary drain path, a slot that can move the hydraulic fluid may be formed on an inner surface of the sleeve on which the pilot poppet slides in an axis direction.

Advantageous Effect

According to embodiments of the present invention having the above-described configuration, in the case of a sole or combined operation of boom-up and arm-out, the hydraulic fluid, which leaks due to the inferior sealing that is caused by the foreign substances on the valve seat surface, is drained to the outside. Accordingly, it becomes possible to prevent the energy loss and the noise occurrence due to an excessive pressure increase and to prevent the work efficiency from being lowered due to deterioration of the operating speed of the working device.

BRIEF DESCRIPTION OF THE DRAWINGS

The above objects, other features and advantages of the present invention will become more apparent by describing the preferred embodiments thereof with reference to the accompanying drawings, in which.

EXPLANATION OF REFERENCE NUMERALS FOR MAIN PARTS IN THE DRAWING

Figure 1:
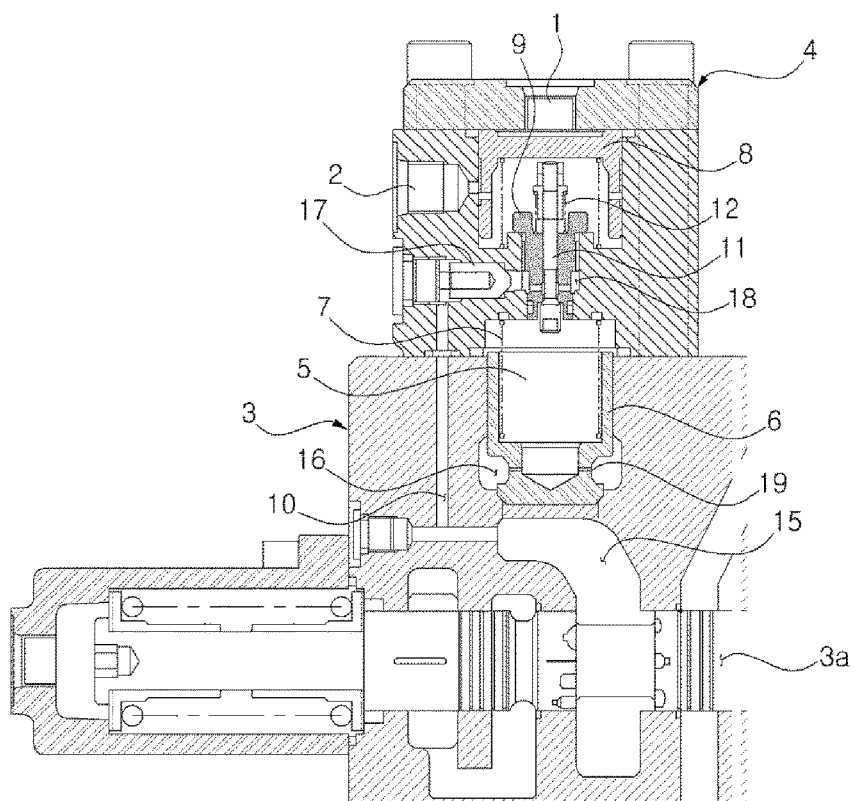
FIG. 1 is a cross-sectional view of a pressure control valve in the related art that is connected to a control valve for a construction machine.

1: pilot signal pressure port
2: drain flow path
3: control valve
4: holding valve block
5: back pressure valve
6: holding poppet
7: first elastic member
8: piston
9: sleeve
10: drain flow path
11: pilot poppet
12: second elastic member
13: hydraulic pump
14: parallel flow path
15: flow path
16: cylinder port
17: check valve
18: port
19: orifice
20: slot
21: notch
22: hydraulic fluid moving hole

DETAILED DESCRIPTION OF THE INVENTION

Hereinafter, a pressure control valve for a construction machine in accordance with a preferred embodiment of the present invention will be described in detail with reference to the accompanying drawings.

Figure 4:
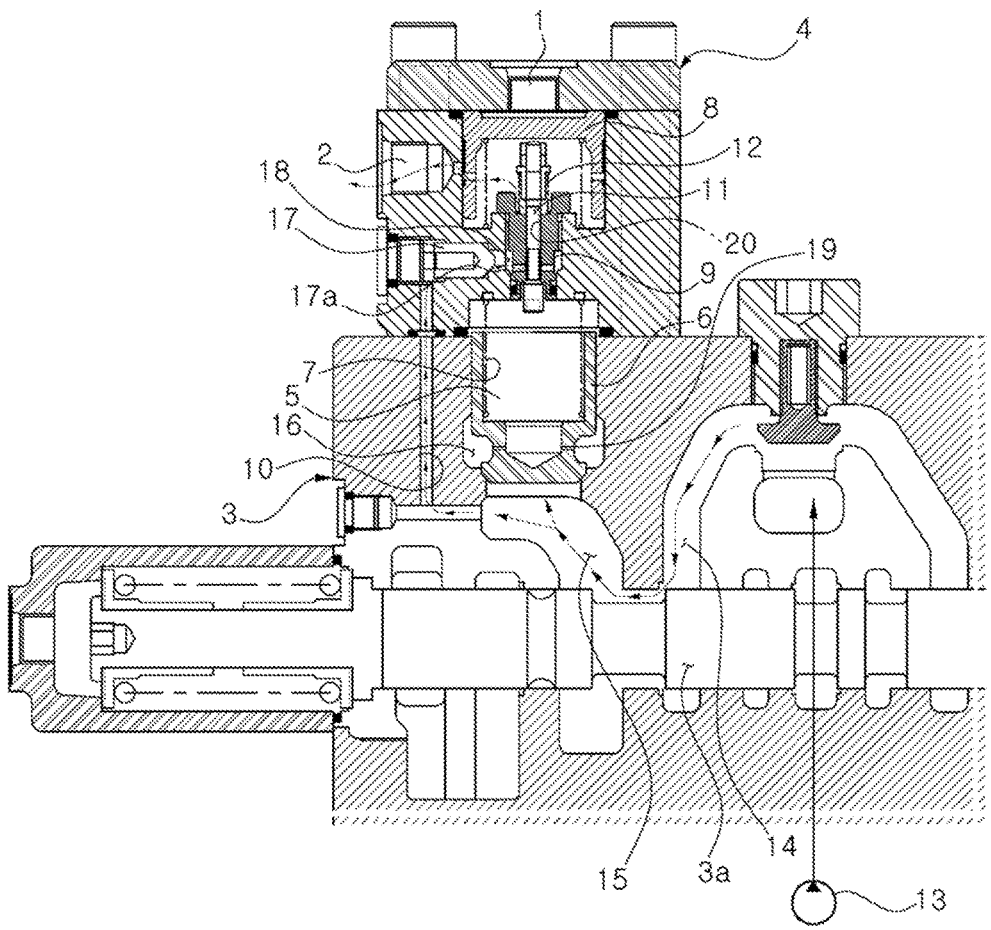
FIG. 4 is a view explaining the operation of a pressure control valve for a construction machine according to an embodiment of the present invention.
Figure 5A:
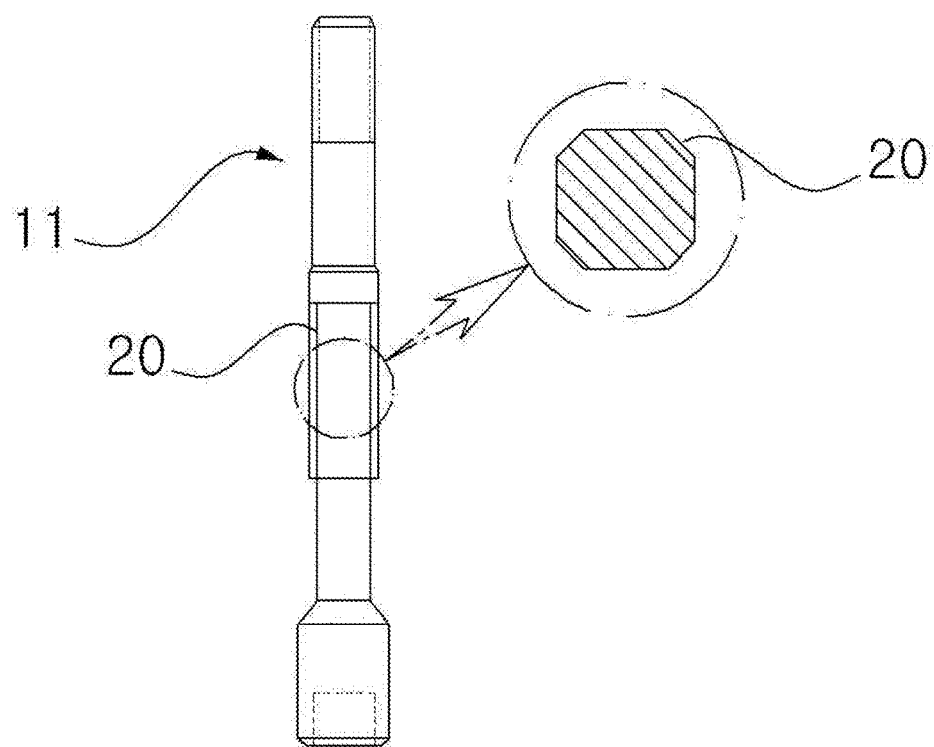
FIGS. 5A to 5C are views illustrating modified examples of a pilot poppet that is mounted on a pressure control valve for a construction machine according to an embodiment of the present invention.
Figure 5B:
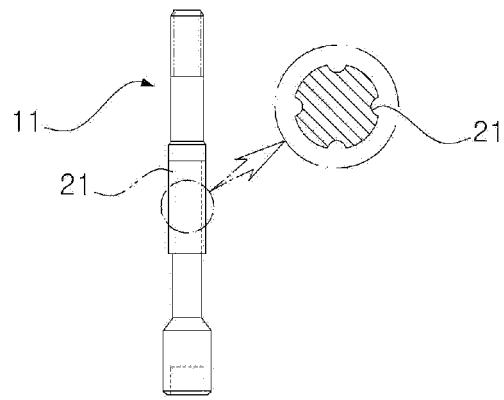
Figure 5C:
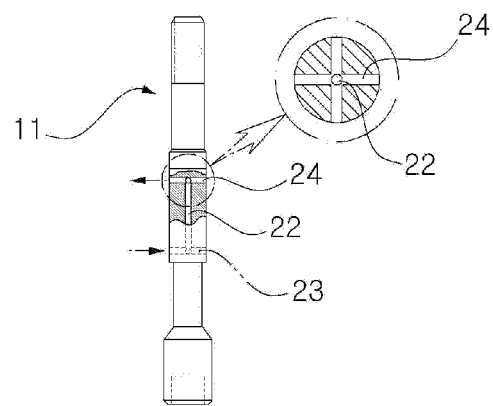
Figure 5D:
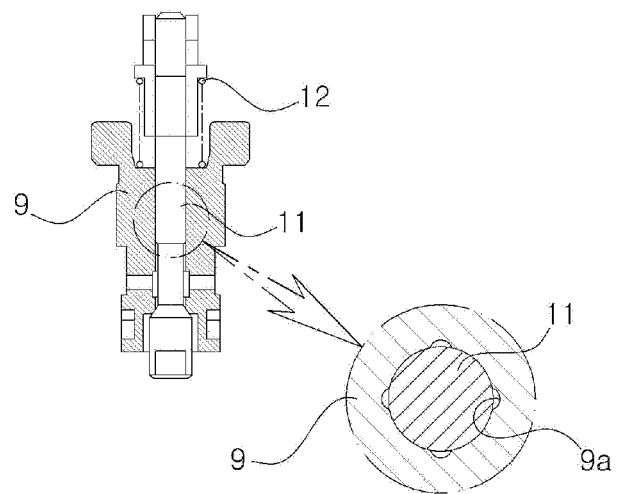
FIG. 5D is a view explaining forming of a slot that can move hydraulic fluid to an inner surface of a sleeve coupled to a pilot poppet in a pressure control valve for a construction machine according to an embodiment of the present invention.

FIG. 4 is a view explaining the operation of a pressure control valve for a construction machine according to an embodiment of the present invention. FIGS. 5A to 5C are views illustrating modified examples of a pilot poppet that is mounted on a pressure control valve for a construction machine according to an embodiment of the present invention, and FIG. 5D is a view explaining forming of a slot that can move hydraulic fluid to an inner surface of a sleeve coupled to a pilot poppet in a pressure control valve for a construction machine according to an embodiment of the present invention.

Referring to FIGS. 4 and 5A, a pressure control valve for a construction machine according to an embodiment of the present invention includes a holding valve block 4 having a pilot signal pressure port 1 and a drain flow path 2 formed thereon and installed between a hydraulic actuator (boom cylinder or the like, not illustrated) and a control valve 3; a holding poppet 6 having a back pressure chamber 5 formed therein to intercept leakage of hydraulic fluid from the hydraulic actuator to the control valve 3 in a neutral state; a first elastic member (a pressure coil spring may be used) 7 pressing the holding poppet 6 and elastically biasing an intercepted path between the hydraulic actuator and the control valve 3 in an initial state; a piston 8 sliding in the holding valve block 4 when pilot signal pressure is input through the pilot signal pressure port 1; a pilot poppet 11 shifted along an inner surface of a sleeve 9 of the holding valve block 4 to drain the hydraulic fluid in the back pressure chamber 5 toward a drain flow path 10 of the control valve 3 in response to movement of the piston 8; a second elastic member 12 (a pressure coil spring may be used) pressing the pilot poppet 11 and elastically biasing an intercepted path between the back pressure chamber 5 of the holding poppet 6 and the drain flow path 10 of the control valve 3 in an initial state; and an auxiliary drain path draining the leaking hydraulic fluid through a drain path 2 of the holding valve block 4 after passing through the pilot poppet 11 if the leakage of the hydraulic fluid occurs on a valve seat surface 17a of a check valve 17 that opens or closes the path between the back pressure chamber 5 of the holding poppet 6 and the drain flow path 10 of the control valve 3.

Referring to FIG. 5A, as the auxiliary drain path, an inner surface of the sleeve 9, on which the pilot poppet 11 slides, may be formed in a rectangular shape, and a slot 20 that can move the hydraulic fluid may be formed at a corner of an outer surface of the pilot poppet 11 that is formed corresponding to the inner surface of the sleeve 9.

Figure 2:
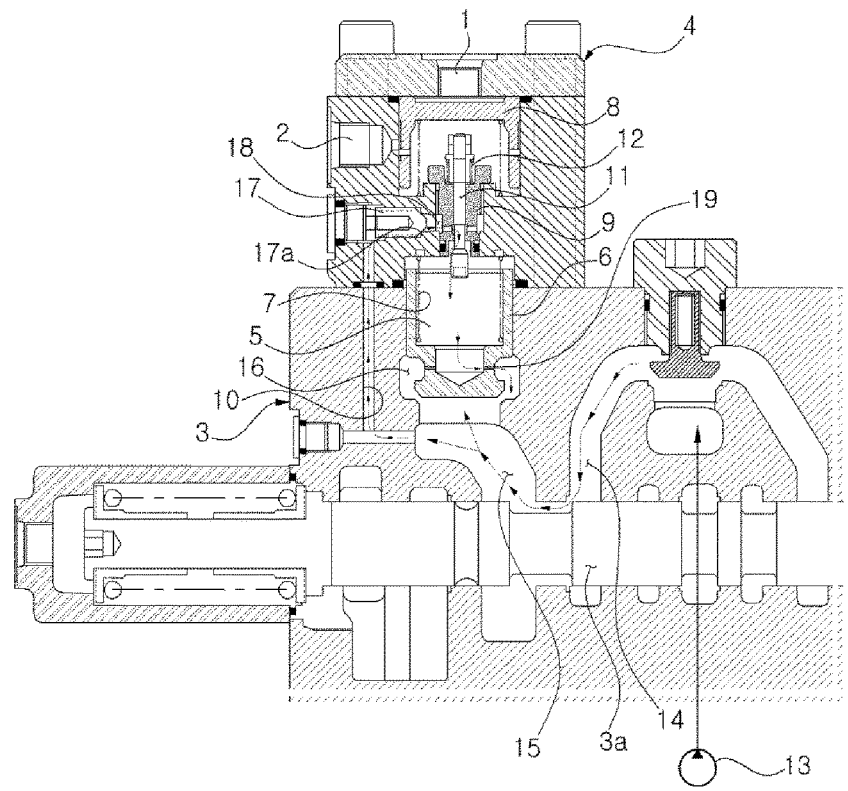
FIG. 2 is a view explaining the operation of a pressure control valve in the related art.
Figure 3:
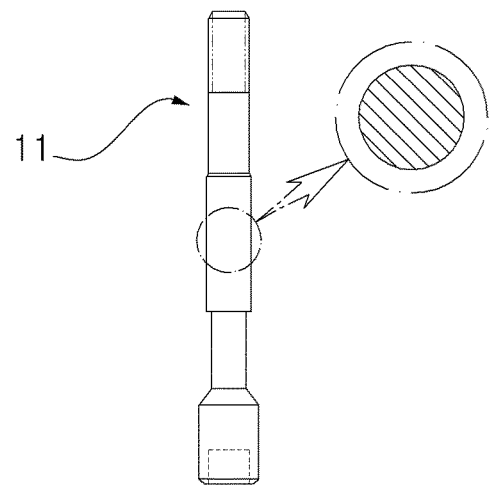
FIG. 3 is a view illustrating a pilot poppet that is mounted on a pressure control valve in the related art.

In this case, since the configuration of a pressure control valve, except for the pilot poppet 11 having the auxiliary drain path formed therein to drain the leaking hydraulic fluid through the drain path 2 of the holding valve block 4 after the hydraulic fluid passes through the pilot poppet 11 if the leakage of the hydraulic fluid occurs on the valve seat surface 17a of the check valve 17, is the same as the configuration of the pressure control valve as illustrated in FIG. 2, the detailed description thereof will be omitted, and the same reference numerals are used for the same constituent elements in the drawings.

According to the above-described configuration, if a spool 3a of the control valve 3 is shifted in a rightward direction in the drawing in accordance with applying of pilot signal pressure, hydraulic fluid that is discharged from the hydraulic pump 13 passes through a flow path and presses the holding poppet 6 to lift the holding poppet 6. That is, As the holding poppet 6 is moved, a path between the flow path 15 and a cylinder port 16 on the hydraulic actuator side is opened, and thus the hydraulic fluid that is discharged from the hydraulic pump 13 is supplied to the hydraulic actuator via the cylinder port 16 through the shifting of the spool 3a of the control valve 3. Through this, a boom cylinder is driven to perform boom-up or boom-down operation.

On the other hand, due to the characteristics of the equipment that mainly works in a field work place, foreign substances, such as dust, remain on the valve seat surface 17a of the check valve 17, and a sealing function may not be completely performed on the valve seat surface 17a. Due to this, hydraulic fluid in the drain flow path 10 of the control valve 3 may flow into the back pressure chamber 5 of the holding poppet 6 via the check valve 17 to press the holding poppet 6.

As described above, if leakage of the hydraulic fluid occurs on the valve seat surface 17a of the check valve 17, the hydraulic fluid in the drain flow path 10 of the control valve 3 moves to a pressure chamber 18 on the side of the pilot poppet 11 via the check valve 17. The hydraulic fluid that has moved to the pressure chamber 18 is supplied to a pressure chamber in the piston 8 through the slot 20 that is formed at the corner of the outer surface of the pilot poppet 11 that slides along the inner surface of the sleeve 9 and is drained to an outside through the drain flow path 2 of the holding valve block 4 (the drain of the hydraulic fluid is indicated by an arrow in FIG. 4). In this case, by an elastic force of the second elastic member 12, the pilot poppet 11 maintains an initial state where the path between the pressure chamber 18 on the side of the pilot poppet 11 and the back pressure chamber 5 of the holding poppet 6 is intercepted.

Accordingly, even in the case where the foreign substances, such as dust, that are generated during working remain on the valve seat surface 17a of the check valve 17 and thus a sealing function is not performed on the valve seat surface 17a to cause the leakage of the hydraulic fluid, it becomes possible to drain the leaking hydraulic fluid to the outside after the hydraulic fluid passes through the drain flow path 2 of the holding valve block 4 via the slot 20 of the pilot poppet 11. Through this, in the case of shifting the spool 3a of the control valve 3 to perform the boom-up operation in accordance with the operation of the operation lever, it becomes possible to supply the hydraulic fluid from the hydraulic pump 13 to the boom cylinder via the parallel path 14—flow path 15—cylinder port 16.

Referring to FIG. 5B, as the auxiliary drain path, several notch portions 21 that can move the hydraulic fluid may be formed on an outer surface of the pilot poppet 11 that slides along the inner surface of the sleeve 9 in an axis direction. Through this, if the leakage of the hydraulic fluid occurs on the valve seat surface 17a of the check valve 17, the hydraulic fluid in the drain flow path 10 of the control valve 3 moves to the port 18 on the side of the pilot poppet 11 via the check valve 17. The hydraulic fluid that has moved to the port 18 is drained to the outside after passing through the pressure chamber in the piston 8, a through-hole of the piston 8, and the drain flow path 2 of the holding valve block 4 in order by the notch portions 21 formed on the outer surface of the pilot poppet 11 in an axis direction.

Referring to FIG. 5C, as the auxiliary drain path, a hydraulic fluid moving hole 22 may be formed inside the pilot poppet 11 that slides along an inner surface of the sleeve 9 in an axis direction, and a hydraulic fluid inflow hole 23 and a hydraulic fluid discharge hole 24 may be formed at an end portion of the hydraulic fluid moving hole 22 in a radius direction to communicate with the hydraulic fluid moving hole 22. Through this, if the leakage of the hydraulic fluid occurs on the valve seat surface 17a of the check valve 17, the hydraulic fluid in the drain flow path 10 of the control valve 3 moves to the port 18 on the side of the pilot poppet 11 via the check valve 17. The hydraulic fluid that has moved to the port 18 moves to the pressure chamber in the piston 8 after passing through the hydraulic fluid inflow hole 23 that is formed in the pilot poppet 11 that slides along an inner surface of the sleeve 9 in the radius direction, the hydraulic fluid moving hole 22 that is formed inside the pilot poppet 11 to communicate with the hydraulic fluid inflow hole 23, and the hydraulic fluid discharge hole 24 that communicates with an end portion of the hydraulic fluid moving hole 22 in order. The hydraulic fluid that has moved to the pressure chamber in the piston 8 is drained to the outside after passing through the through-hole of the piston 8 and the drain flow path 2 of the holding valve block 4.

Referring to FIG. 5D, as the auxiliary drain path, a slot 9a that can move the hydraulic fluid may be formed on an inner surface of the sleeve 9 on which the pilot poppet 11 slides in an axis direction. Through this, if the leakage of the hydraulic fluid occurs on the valve seat surface 17a of the check valve 17, the hydraulic fluid in the drain flow path 10 of the control valve 3 moves to the port 18 on the side of the pilot poppet 11 via the check valve 17. The hydraulic fluid that has moved to the port 18 is drained to the outside after passing through the pressure chamber in the piston 8, the through-hole of the piston 8, and the drain flow path 2 of the holding valve block 4 in order along the slot 9a that is formed on the inner surface of the sleeve 9 in an axis direction.

Although the present invention has been described with reference to the preferred embodiments in the attached figures, it is noted that equivalents may be employed and substitutions made herein without departing from the scope of the invention as recited in the claims.

INDUSTRIAL APPLICABILITY

According to the present invention having the above-described configuration, in the case of a sole or combined operation of boom-up and arm-out, the hydraulic fluid, which leaks due to the inferior sealing that is caused by the foreign substances on the valve seat surface, is drained to the outside. Accordingly, it becomes possible to prevent the energy loss and the noise occurrence due to an excessive pressure increase and to prevent the work efficiency from being lowered due to deterioration of the operating speed of the working device.

While the present invention has been described in connection with the specific embodiments illustrated in the drawings, they are merely illustrative, and the invention is not limited to these embodiments. It is to be understood that various equivalent modifications and variations of the embodiments can be made by a person having an ordinary skill in the art without departing from the spirit and scope of the present invention. Therefore, the true technical scope of the present invention should not be defined by the above-mentioned embodiments but should be defined by the appended claims and equivalents thereof.

What is claimed is:

1. A pressure control valve for a construction machine, comprising:
    a holding valve block having a pilot signal pressure port and a drain flow path formed thereon and installed between a hydraulic actuator and a control valve;
    a holding poppet having a back pressure chamber formed therein to intercept leakage of hydraulic fluid from the hydraulic actuator to the control valve in a neutral state;
    a first elastic member pressing the holding poppet and elastically biasing an intercepted path between the hydraulic actuator and the control valve in an initial state;
    a piston sliding in the holding valve block when pilot signal pressure is input through the pilot signal pressure port;
    a pilot poppet shifted along an inner surface of a sleeve of the holding valve block to drain the hydraulic fluid in the back pressure chamber toward a first drain flow path of the control valve in response to movement of the piston;
    a second elastic member pressing the pilot poppet and elastically biasing an intercepted path between the back pressure chamber of the holding poppet and the first drain flow path of the control valve in an initial state; and
    an auxiliary drain path draining the leaking hydraulic fluid through a second drain path of the holding valve block after passing through the pilot poppet if the leakage of the hydraulic fluid occurs on a valve seat surface of a check valve that opens or closes the path between the back pressure chamber of the holding poppet and the first drain flow path of the control valve.

2. The pressure control valve according to claim 1, wherein as the auxiliary drain path, an inner surface of the sleeve, on which the pilot poppet slides, is formed in a rectangular shape, and a slot that can move the hydraulic fluid is formed at a corner of an outer surface of the pilot poppet that is formed corresponding to the inner surface of the sleeve.

3. The pressure control valve according to claim 1, wherein as the auxiliary drain path, a notch portion that can move the hydraulic fluid is formed on an outer surface of the pilot poppet that slides along an inner surface of the sleeve in an axis direction.

4. The pressure control valve according to claim 1, wherein as the auxiliary drain path, a hydraulic fluid moving hole is formed inside the pilot poppet that slides along an inner surface of the sleeve in an axis direction, and a hydraulic fluid inflow hole and a hydraulic fluid discharge hole are formed at an end portion of the hydraulic fluid moving hole in a radius direction to communicate with the hydraulic fluid moving hole.

5. The pressure control valve according to claim 1, wherein as the auxiliary drain path, a slot that can move the hydraulic fluid is formed on an inner surface of the sleeve on which the pilot poppet slides in an axis direction.

* * * * *